…

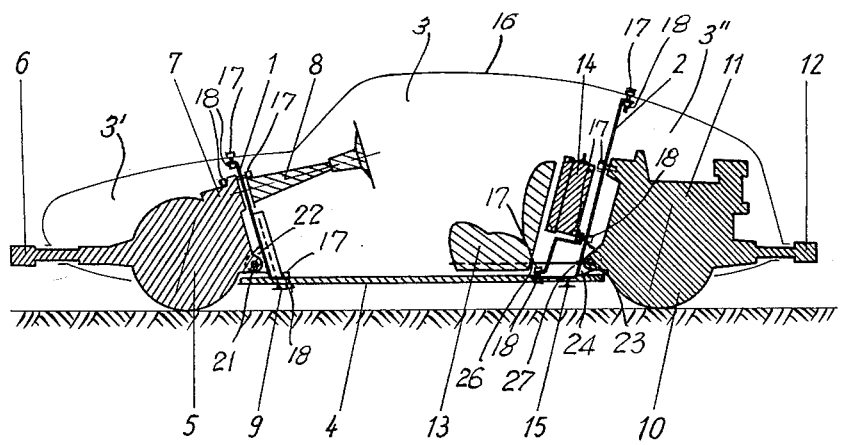

United States Patent Office 2,703,626
Patented Mar. 8, 1955

2,703,626

VEHICLE BODY CONNECTION AND ASSEMBLY WITH WHEELED UNITS

Béla Barényi, Stuttgart-Rohr, Germany

Application January 26, 1950, Serial No. 140,584

Claims priority, application Germany February 1, 1949

2 Claims. (Cl. 180—54)

This invention relates to a motor vehicle and more particularly to an automobile body, and provides a strong lightweight body construction which is particularly adapted to withstand the stresses set up by the forces acting upon the vehicle. Objects of the invention are simplification of construction and economy in manufacture.

Accordingly an important feature of the present invention consists therein that all, or almost all parts, which set up the principal forces, as, for example, power plant, axle assemblies, seats, operating equipment consisting of steering gear case, control system, stationary jacks and the like are supported on the cross partitions or transverse walls of the automobile body. This construction, contrary to the usual arrangement in which these parts are supported mainly on the frame or on the structural members of the body, renders it possible to reduce the number of parts necessary for fastening. Furthermore, the cross partitions can without any difficulty be developed to be very rigid, whereas the other unstressed parts of the vehicle can be kept very light, so that a unitary lightweight structure is obtained.

It is preferable to use such cross partitions or transverse walls which separate the passenger compartment of the vehicle from the front and rear compartments respectively of the vehicle. The connections of the cross partitions or transverse walls to the frame or, in the absence of such a frame, to the floor of the vehicle body may be accomplished in any conventional manner, as for example, by means of bolting, riveting, welding, spot welding or the like.

One embodiment of the present invention is illustrated schematically in the accompanying single view of the drawing by way of example.

Referring now more particularly to the drawing, the vehicle illustrated therein has a rear-end drive, and is provided with two cross partitions or transverse walls 1 and 2 which separate and close the front compartment 3' and the rear compartment 3" from the passenger compartment 3 respectively.

The partitions or transverse walls 1 and 2 are secured to the frame of the vehicle, such as the unitary self-supporting body 16, including the body floor 4, in any well-known manner, as by means of bolts and nuts 17 and 18. It is understood, however, that welding, riveting, spot welding or the like may be used in the place of bolts and nuts 17 and 18, if so desired.

The front axle aggregate 5, together with the front bumper 6, the steering gear case 7, the drive and control system 8, the foot pedals (not illustrated), etc., as well as the stationary car jack 9 are mounted on the forward cross partition or transverse wall 1.

For purposes of mounting the front axle aggregate 5 with the front bumper 6, the steering gear case 7 and the drive and control system 8 on the cross partition or transverse wall 1, bolts and nuts 17 and 18 may be used which extend through the transverse wall 1 and through or into the flange portions provided on the control system 8 and steering gear case 7.

Furthermore, the front axle aggregate 5 is also fastened to the transverse wall 1 by means of a transverse hinge or linkage 21 which extends transversely through bracket members 22 appropriately fastened to the transverse wall 1 on both sides thereof.

The car jack 9 may also be secured to the body floor 4 of the vehicle in any suitable manner so as to permit lifting of the vehicle by the car jack when so desired.

The rear axle aggregate 10, the power plant 11, and the rear bumper 12 are mounted on the rear end of cross partition or transverse wall 2 in a similar manner. Again a suitable fastening means, such as a bolt 17 connects a forwardly extending portion of the power plant 11 with the transverse wall 2 through which it extends. The lower portion of the rear axle aggregate 10 is fastened to the transverse wall 2 by means of a transverse hinge or linkage 23 which extends through a lower, forwardly extending portion of the rear axle aggregate 10 and through bracket members 24 appropriately fastened to the rear transverse wall 2 on both sides thereof. The luggage carrier 14 may be fastened to the transverse rear wall 2 and/or to the body floor 4 by bolts and nuts 17 and 18. The rear seats 13 are supported by a support member 26, which may also be fastened to the transverse wall 2 as at 27 by means of, for example, welding or bolting. Reference numeral 15 refers to a second car jack which may also be fastened to the floor 4 of the vehicle in any suitable manner to permit lifting of the vehicle by the jack when so desired.

Thus, the axle assemblies 5 and 10 respectively, and the power plant 11 are mounted to the cross partitions 1 and 2 by means of lower transverse linkage or hinges in connection with a longitudinal upper linkage or connecting member.

It will be obvious to those who are familiar with such matters that the details of construction may be varied from those shown by me and yet the essentials of the invention be retained. I therefore do not limit myself to such details.

What I claim is:

1. In a passenger motor vehicle having a unitary self-supporting body and two spaced transverse axle means, a separate front transverse wall and a separate rear transverse wall located intermediate said axle means, said transverse walls being spaced from one another and extending from the floor to the top defined by said vehicle thereby closing off the passenger compartment at the front and rear end thereof, the front transverse wall being inclined toward the front end of the vehicle and the rear transverse wall being inclined towards the rear end of said vehicle, means for individually and directly fastening each of said transverse walls to said self-supporting body, and means for connecting to said transverse walls the parts of said vehicle exerting the main forces including the motor, said axle means and operating equipment.

2. In a passenger motor vehicle according to claim 1, wherein said transverse walls are fastened to said self-supporting body by bolting means.

References Cited in the file of this patent

UNITED STATES PATENTS

| | | |
|---|---|---|
| Re. 20,171 | Curtiss | Nov. 17, 1936 |
| 2,128,930 | Fageol et al. | Sept. 6, 1938 |

FOREIGN PATENTS

| | | |
|---|---|---|
| 476,100 | Great Britain | Dec. 1, 1937 |
| 815,090 | France | July 5, 1937 |

OTHER REFERENCES

Ser. No. 368,684, Barenyi et al. (A. P. C.), published May 25, 1943 (now abandoned).